US012423216B2

(12) United States Patent
Bakucz et al.

(10) Patent No.: US 12,423,216 B2
(45) Date of Patent: Sep. 23, 2025

(54) RATING OF THE RELEVANCE OF TEST CASES FOR TECHNICAL SYSTEMS

(71) Applicant: Robert Bosch GmbH, Stuttgart (DE)

(72) Inventors: Peter Bakucz, Klosterlechfeld (DE); Gyorgy Csaba, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 189 days.

(21) Appl. No.: 18/336,548

(22) Filed: Jun. 16, 2023

(65) Prior Publication Data
US 2024/0004783 A1 Jan. 4, 2024

(30) Foreign Application Priority Data
Jun. 30, 2022 (DE) ...................... 10 2022 206 723.1

(51) Int. Cl.
*G06F 11/3668* (2025.01)
(52) U.S. Cl.
CPC .............................. *G06F 11/3676* (2013.01)
(58) Field of Classification Search
CPC .................... G06F 11/3676; G06F 717/124
USPC ..................................................... 717/124
See application file for complete search history.

(56) References Cited

U.S. PATENT DOCUMENTS

| | | | | |
|---|---|---|---|---|
| 11,734,159 | B2* | 8/2023 | Dutta | G06F 11/3676 |
| | | | | 717/124 |
| 12,221,653 | B2* | 2/2025 | Babiarz | C12Q 1/6809 |
| 2019/0294531 | A1* | 9/2019 | Avisror | G06F 11/3698 |
| 2019/0377670 | A1* | 12/2019 | Rivoir | G06F 11/368 |
| 2021/0182707 | A1* | 6/2021 | Weyrich | G06N 5/022 |

FOREIGN PATENT DOCUMENTS

EP 0339056 B1 5/1993

* cited by examiner

*Primary Examiner* — Wei Y Zhen
*Assistant Examiner* — Amir Soltanzadeh
(74) *Attorney, Agent, or Firm* — NORTON ROSE FULBRIGHT US LLP

(57) ABSTRACT

A method for rating the relevance of a test case for assessing the behavior of a technical system, whose dynamics are described by a scalar dynamics function in the current state of the system, in the control currently impressed upon the system, as well as in the time. In the method: an optimized control problem is set up, in which the scalar dynamics function and/or an integral thereof with respect to time, is to be minimized under the boundary condition that the dynamics of the technical system in the first order is limited to a function; it is ascertained how closely the test case approaches a solution of the optimized control problem; and the closer the test case approaches a solution of the optimized control problem, the more relevant the test case is rated for the assessment of the behavior of the technical system.

13 Claims, 2 Drawing Sheets

RATING OF THE RELEVANCE OF TEST CASES FOR TECHNICAL SYSTEMS

CROSS REFERENCE

The present application claims the benefit under 35 U.S.C. § 119 of German Patent Application No. DE 10 2022 206 723.1 filed on Jun. 30, 2022, which is expressly incorporated herein by reference in its entirety.

FIELD

The present invention relates to the examining and monitoring of technical systems for predictability of their behavior.

BACKGROUND INFORMATION

For the control of many technical systems, it is important to make a prediction of the dynamics of the system in the future from the sensorial monitoring of the system over an earlier time frame. This prediction is ascertained from the sensorially acquired measurement data with the aid of a model and is used as a basis for the further control of the specific system. Thus, for example, a vehicle may predict its future operating dynamics in advance for at least some units of time or time steps, with the aid of sensor data, and in some instances, a control system may act to alter these operating dynamics in the desired manner. An example of such a control system is the electronic stability program (ESP) according to European No. EP 0 339 056 B1.

Such systems that are critical with regard to safety must be tested thoroughly prior to release for regular operation. Thus, for example, multiple test situations must be run through for a system, which controls the at least semi-automated driving of a vehicle.

SUMMARY

The present invention provides a method for rating the relevance of a test case for the assessment of the behavior of a technical system. According to an example embodiment of the present invention, the relevance of a test case and/or a number of test cases may be measured, for example, according to the conditional probability that the behavior of the technical system corresponds, in each instance, to an expectation linked to the respective operating situation, in all operating situations, under the condition that for the test case or set of test cases, the technical system behaves as expected in the respective test case.

Such technical systems, whose dynamics may be described by a scalar dynamics function $L(x,u,t)$, are considered. In this, x characterizes the current state of the technical system, u characterizes control currently impressed upon the system (that is, a control action), and t is the time. In particular, x and u may be, for example, vectors having a plurality of components.

In the broadest sense, control action u may also be regarded as a velocity in the phase space of the controllable parameters and/or state variables of the technical system, which is not deduced directly as a derivative of state x, but is influenced by active "accelerating," "braking," and "steering" in the phase space.

According to an example embodiment of the present invention, in the scope of the method, an optimized control problem is set up, in which by impressing suitable control u upon the technical system, scalar dynamics function $L(x,u,t)$ and/or an integral of this dynamics function $L(x,u,t)$ with respect to time is to be minimized. The impressing of a timing program for control u also changes the timing program of state x of the technical system in accordance with the dependencies and constraints in the technical system. In the following, the combination of the two timing programs $u(t)$ and $x(t)$ is written as combined timing program $(x,u,t)$. Optimally combined timing program $(x^\#,u^\#,t^\#)$ minimizes dynamics function $L(x,u,t)$ and/or its integral with respect to time $$I(t_0) = \Phi(x(T), T) = \int_{t_0}^{T} L(x, u, t)dt$$

from a starting time $t_0$ to an ending time T.

Accordingly, there is also the test case $(x^*,u^*,t^*)$ to be checked, in the form of a combination of two timing programs $u^*(t^*)$ and $x^*(t^*)$. Now, how closely this test case $(x^*,u^*,t^*)$ to be checked approaches a solution $(x^\#,u^\#,t^\#)$ of the optimized control problem, is determined. The closer the test case $(x^*,u^*,t^*)$ to be checked approaches a solution $(x^\#,u^\#,t^\#)$ of the optimized control problem, the higher the relevance of this test case $(x^*,u^*,t^*)$ is rated for the assessment of the behavior of the technical system.

For example, a solution $(x^\#,u^\#,t^\#)$ of the optimized control problem may be obtained, and how close the test case $(x^*,u^*,t^*)$ to be checked approaches this solution $(x^\#,u^\#,t^\#)$, may then be ascertained, using an arbitrary, suitable measure of distance. However, it is not absolutely necessary to know solution $(x^\#,u^\#,t^\#)$ explicitly. On the contrary, computational methods and/or approximation methods may be used, which directly yield a distance and/or similarity of the test case $(x^*,u^*,t^*)$ to be checked, from/to a solution $(x^\#,u^\#,t^\#)$, but not this solution $(x^\#,u^\#,t^\#)$ itself.

According to an example embodiment of the present invention, The optimized control problem may be provided with arbitrary initial conditions $x(t_0)$ for state x of the technical system at starting time $t_0$. In addition, an ending condition $$\Psi(x(T),T)=0$$

for ending time T may also be predefined in such a manner, that probability density function $\Psi$ for state $x(t)$ of the technical system disappears in end state $x(T)$ at ending time T.

It has been recognized that the examination of the technical system may be carried out markedly more rapidly and at reduced cost, using the rating of the relevance of test cases proposed here according to the present invention. It is normally required that in all test cases $(x^*,u^*,t^*)$ from a predefined catalog, the technical system behave, in each instance, as expected. The catalog of test cases $(x^*,u^*,t^*)$ may be provided, for example, by the customer, who gives the job of implementing the technical system. If the technical system does not behave as expected for only a single test case $(x^*,u^*,t^*)$, as well, then its overall examination is not passed. Now, if this is not determined, for instance, until the nth and last test case $(x^*,u^*,t^*)$, then the complete labor and financial commitment for the n−1 tests already carried out is lost. This outlay could have been eliminated, if the test not passed had been carried out first. This is comparable, for instance, to a situation where a prospective pilot receives practical education for years valued at over 100,000 €, and it is only determined at the very end, that his/her certificate of a criminal record issued by the police has a collection of negative entries that precludes the granting of a license. In this case, it would have been more economical to filter out the applicant immediately in the written application procedure and not even invite him/her for an interview.

According to an example embodiment of the present invention, using the method provided here, the test cases may be selectively prioritized, which are "make or break" for the overall examination in the sense that, if the system passes these test cases, then it will probably pass all the others, as well. A savings in testing expenditure is always produced, if for at least one test case (x*,u*,t*), the system does not behave as expected. However, this very thing may well pass through during the development phase of technical systems.

Consequently, in a particularly advantageous embodiment of the present invention, a predetermined catalog of test cases (x*,u*,t*) is provided. This catalog may be obtained, for example, by calculating analytical solutions of a differential equation, which the system follows. However, as an alternative to this, or in combination with this, the catalog may be predefined explicitly, for example, within the scope of a customer specification. The relevance of each test case (x*,u*,t*) from the catalog is ascertained as described above. A list of test cases (x*,u*,t*) is then generated, which is sorted in descending order of these relevances of test cases (x*,u*,t*). The test cases (x*,u*,t*), which occupy the front places in this list, may be regarded as "critical test cases" in that the probability of the technical system functioning in all cases as expected is high, if it functions, in each instance, as expected for these very test cases.

Thus, in a further advantageous embodiment of the present invention, the technical system is tested consecutively, using the test cases (x*,u*,t*) in the order of the list. These tests may be carried out on a physical specimen of the technical system, as well as, alternatively, or even in combination with this, on a mathematical model or "digital twin" of the technical system.

Each individual test for a test case (x*,u*,t*) is judged to be passed, if, starting out from this test case (x*,u*,t*), the dynamics of the technical system fulfill an expectation linked to this test case (x*,u*,t*). In response to at least one individual test's not being passed, the examination of the technical system as a whole is aborted and judged not to be passed. In response to all of the tests' being passed, the examination of the technical system as a whole is judged to be passed.

In this manner, in particular, during the development of technical systems, ideas for changes and/or improvements may be subjected to rapid prescreening. For example, out of 100 ideas advanced, 30 ideas may clear the hurdle of the first test cases (x*,u*,t*) on the list and be able to be pursued further. To a certain extent, this is analogous to the fact that, for example, in the development of neural networks or other machine learning models, a first trial is often carried out, using well-known, publicly available, standard data sets. If it is processing of images, this may be, for example, handwritten numerals from the MNIST data set. Ideas newly proposed must then be judged by the extent, to which they demonstrate a higher performance on the standard data sets than the conventional methods.

In a further, particularly advantageous embodiment of the present invention, the testing of the technical system may include an examination as to whether a differential equation set up for the dynamics of the technical system on the basis of scalar dynamic function L(x,u,t) is solvable analytically. If this differential equation is solvable analytically, this indicates that the differential equation describes the dynamics of the technical system completely. However, if the differential equation is not solvable analytically, this indicates that even more belongs to the dynamics of the technical system than what is described by the differential equation.

In particular, e.g., a technical system may be selected, whose dynamics may be described by a Lagrange function L=T−V in the form of a dynamics function L(x,u,t); T corresponding to a kinetic energy, and V corresponding to a potential energy of the technical system. The Euler-Lagrange equation may then be formulated from the Lagrange function, and it may then be checked if the Euler-Lagrange equation is solvable analytically.

Consequently, the test for analytical solvability may replace tests on a physical specimen of the technical system completely or partially. Thus, the rated relevance of a test case (x*,u*,t*) is advantageously a measure of the extent, to which the analytic solvability of a differential equation set up for the dynamics of the technical system on the basis of scalar dynamics function L(x,u,t), starting from this test case (x*,u*,t*), also implies analytic solvability, starting out from other test cases (x*,u*,t*). In this connection, what may also occur is the case, in which a plurality of test cases (x*,u*,t*) have the same relevances, and, for example, only a few test cases (x*,u*,t*) move up or down from this. However, for example, a lot is already gained, if only a single test case (x*,u*,t*) having particularly high relevance is examined first.

In a further particularly advantageous embodiment of the present invention, at least one solution $(x^\#,u^\#,t^\#)$ of the optimized control problem is ascertained at least approximately or, for example, analytically, as well. The proximity and/or similarity of a test case (x*,u*,t*) to solution $(x^\#,u^\#,t^\#)$ may then be ascertained, as explained above, by direct use of a measure of distance and/or similarity. As an option, retrieved solution $(x^\#,u^\#,t^\#)$ may also be rated equally as a test case (x*,u*,t*) having the highest relevance.

For example, solution $(x^\#,u^\#,t^\#)$ of the optimized control problem may be ascertained, in particular, as a stationary solution with regard to control u. For example, the optimized control problem may be set up as a minimization problem for the functional $$H(x,u,t)=L(x,u,t)+\lambda^T f(x,u,t),$$

in which Δ is a matrix of Lagrange multipliers. H is also called a Euler-Lagrange function. In this connection, dynamics function L does not necessarily have to be the Lagrange function L=T−V known from mechanics, in which T is a kinetic energy and V is a potential energy. Other dynamics functions L may also be used.

The following state equations result from the expression for H $$\dot{x} = f(x, u, t) = \frac{\partial H}{\partial \lambda},$$

as well as costate equations $$\dot{\lambda} = \frac{\partial H}{\partial x}.$$

The stationary solution results in the condition $$\frac{\partial H}{\partial u} = 0.$$

Finally, the following is derived in view of boundary conditions and initial conditions $$(\Phi_x + \Psi_x^T u - \lambda)^T|_T dx(T) + (\Phi_t + \Psi_x^T u - H)|_T dT = 0.$$

In it, t is the time, $u-\mathbb{R}^m$ is a control vector having m elements, $x \in \mathbb{R}^n$ is a state vector containing n elements, and $\lambda \in \mathbb{R}^n$ is a costate vector of Lagrange multipliers, having n elements, as well. In this form, the optimized control problem is a boundary value problem that is to be solved numerically and has two boundaries, on each of which conditions are specified.

In one advantageous embodiment of the present invention, the solution $(x^\#, u^\#, t^\#)$ is ascertained by a genetic algorithm, through crossing, selection, and mutation of solution candidates. This means that, for instance, a starting population including randomly generated solution candidates may initially be produced. Then, as a function of how effectively or how poorly these solution candidates are as solutions to the optimized control problem ("fitness evaluation"), solution candidates may then be selected, crossed with each other, and even mutated randomly within pre-defined limits. This forms a new generation of solution candidates, and the selection, crossing, selection, and mutation may be continued in the same manner, until a specified number of generations is attained.

In one further advantageous embodiment of the present invention, solution $(x^\#, u^\#, t^\#)$ is ascertained while reducing the optimized control problem to an initial value problem. In this connection, values at the first boundary are initially selected in such a manner, that the boundary conditions there are satisfied. Starting out from this, the differential equations explained above are integrated, until the secondary boundary is reached. In general, the boundary conditions there are not satisfied initially. Now, the values at the first boundary are optimized to the effect that the boundary conditions are also satisfied at the second boundary, using, for example, a gradient-based search method (Newton-Raphson).

In the case of shooting with artillery, this is somewhat analogous to varying the initial conditions given to a projectile at the starting location, in such a manner, that the projectile strikes a distant target. Thus, the reduction of a boundary value problem to an initial value problem is also referred to as a "shooting method."

In a further particularly advantageous embodiment of the present invention, Lagrange multipliers A of the optimized control problem are initially ascertained by the genetic algorithm. Subsequently, a timing program for state x* of the test case (x*,u*,t*) sought after is ascertained while reducing the optimized control problem to an initial value problem. The test case (x*,u*,t*) sought after is then determined completely by this. This means that the timing program for control u* is no longer independent, but is derived from the timing program for state x* and from Lagrange multipliers lambda. In this manner, the advantages of the genetic algorithm and the shooting method may be combined. The genetic algorithm may explore the solution space effectively in its entirety and also find a global optimum without an effective, initial estimate of the solution. The shooting method may build on this and rapidly converge to the optimum, which is obtained at a high accuracy, as well. In this respect, a synergy effect between the two methods is utilized.

This combination of methods is also particularly efficient with regard to the requirements for computing power and storage. Thus, in a further particularly advantageous embodiment, the method may be executed in real time in an embedded system, which is contained in the technical system or carried by it. Then, the method may advantageously be used not only offline in the scope of the development and/or release, but also as online monitoring. Thus, for example, starting out from an operating situation of a technical system monitored by sensors, the extent, to which the differential equation formulated on the basis of dynamics function L(x,u,t) completely describes the dynamics of the technical system, may be checked with the aid of a test suite made up of only a few particularly relevant test cases (x*,u*,t*). If this is not the case, the technical system may behave differently from what the differential equation predicts. Then, a corrective intervention in the technical system planned on the basis of the description of the dynamics does not produce, perhaps, the desired result, but another result.

In a further particularly advantageous embodiment of the present invention, a vehicle and/or a traffic situation including a plurality of road users is selected as a technical system. In particular, traffic situations may suddenly develop in such a manner, that a description by a differential equation and a combination of sensor data, which was just perfectly adequate, is suddenly no longer sufficient. For example, during a trip on a country road over long distances, modeling of the traffic situation without accurate depth information may be sufficient, since one only has to stay in his/her lane and pay attention to traffic signs. However, if a vehicle in the oncoming traffic now suddenly changes lanes to pass and approaches the reference vehicle head-on, then the further development of the situation is a function of how rapidly the overtaker is approaching and if he/she is still able to pull past the overtaken vehicle in time, in order to make it back into his/her traffic lane. Reliable depth information regarding the traffic situation is needed for this.

The method according to the present invention may be implemented, in particular, completely or partially by computer. Thus, the present invention also relates to a computer program including machine-readable instructions, which, when they are executed on one or more computers, cause the computer(s) to implement the method described. Along these lines, control units for vehicles and embedded systems for technical devices, which are likewise able to execute machine-readable instructions, are also to be regarded as computers.

The present invention also relates to a machine-readable storage medium and/or to a download product including the computer program. A download product is a digital product, which is transmittable over a data network, that is, is downloadable by a user of the data network, and may, for example, be offered for sale in an online shop for immediate downloading.

In addition, one or more computers may be supplied with the computer program, with the machine-readable storage medium, and/or with the download product.

Further measures improving the present invention are represented below in more detail, in light of figures, together with the description of the preferred exemplary embodiments of the present invention.

DETAILED DESCRIPTION OF EXAMPLE EMBODIMENTS

Figure 1:
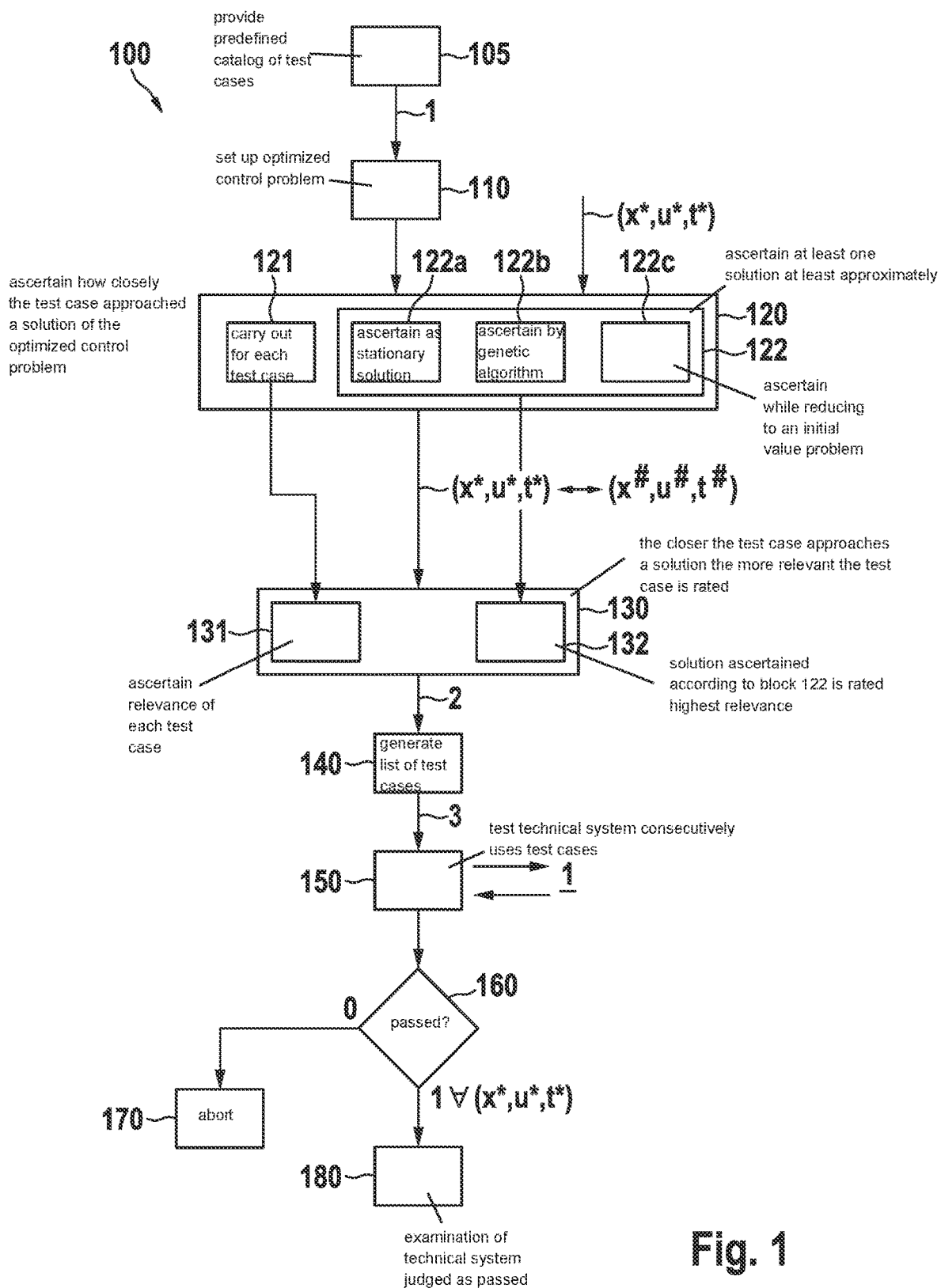
FIG. 1 show an exemplary embodiment of method 100 for rating the relevance of a test case (x*,u*,t*), according to the present invention.

FIG. 1 is a schematic flow chart of an exemplary embodiment of method 100 for rating the relevance 2 of a test case $(x^*,u^*,t^*)$ for the assessment of the behavior of a technical system 1.

In step 105, a predefined catalog of test cases $(x^*,u^*,t^*)$ is provided.

In step 110, an optimized control problem is set up, in which a scalar dynamics function $L(x,u,t)$ of technical system 1, and/or an integral of this dynamics function $L(x,u,t)$ with respect to time, is to be minimized. This problem is subject to the boundary condition, that dynamics $\dot{x}$ of technical system 1 in the first order is limited to a function $f$ according to $\dot{x}=f(x,u,t)$.

How closely test case $(x^*,u^*,t^*)$ approaches a solution $(x^\#,u^\#,t^\#)$ of the optimized control problem, is ascertained in step 120. As explained above, solution $(x^\#,u^\#,t^\#)$ itself is not necessarily needed for this.

According to block 121, this may be carried out for each test case $(x^*,u^*,t^*)$ from the predefined catalog.

According to block 122, at least one solution $(x^\#,u^\#,t^\#)$ of the optimized control problem may be ascertained at least approximately.

According to block 122a, solution $(x^\#,u^\#,t^\#)$ of the optimized control problem may be ascertained as a stationary solution with regard to control u.

According to block 122b, solution $(x^\#,u^\#,t^\#)$ may be ascertained by a genetic algorithm, through crossing, selection, and mutation of solution candidates 4.

According to block 122c, solution $(x^\#,u^\#,t^\#)$ may be ascertained while reducing the optimized control problem to an initial value problem.

In step 130, the closer test case $(x^*,u^*,t^*)$ approaches a solution $(x^\#,u^\#,t^\#)$ of the optimized control problem, the more relevant 2 the test case is rated for the assessment of the behavior of technical system 1.

According to block 131, relevance 2 of each test case $(x^*,u^*,t^*)$ from the predefined catalog may be ascertained.

According to block 132, a solution $(x^\#,u^\#,t^\#)$ ascertained according to block 122 is rated as a test case $(x^*,u^*,t^*)$ having the highest relevance 2.

In step 140, a list 3 of test cases $(x^*,u^*,t^*)$ is generated, which is sorted in descending order of these relevances 2 of test cases $(x^*,u^*,t^*)$.

In step 150, technical system 1 is tested consecutively, using test cases $(x^*,u^*,t^*)$ in the order of list 3. As explained above, such a test may be carried out on a physical specimen of technical system 1, but also, for example, on a mathematical model or digital twin of the technical system.

In step 160, it is checked if the individual tests for test cases $(x^*,u^*,t^*)$ are each to be judged as passed.

If this is not the case for even a single test (truth value 0), then, in step 170, the examination of technical system 1 as a whole is aborted and judged not to be passed.

However, if each individual test is passed for all test cases (truth value 1), then, in step 180, the examination of technical system 1 as a whole is judged to be passed.

Figure 2:
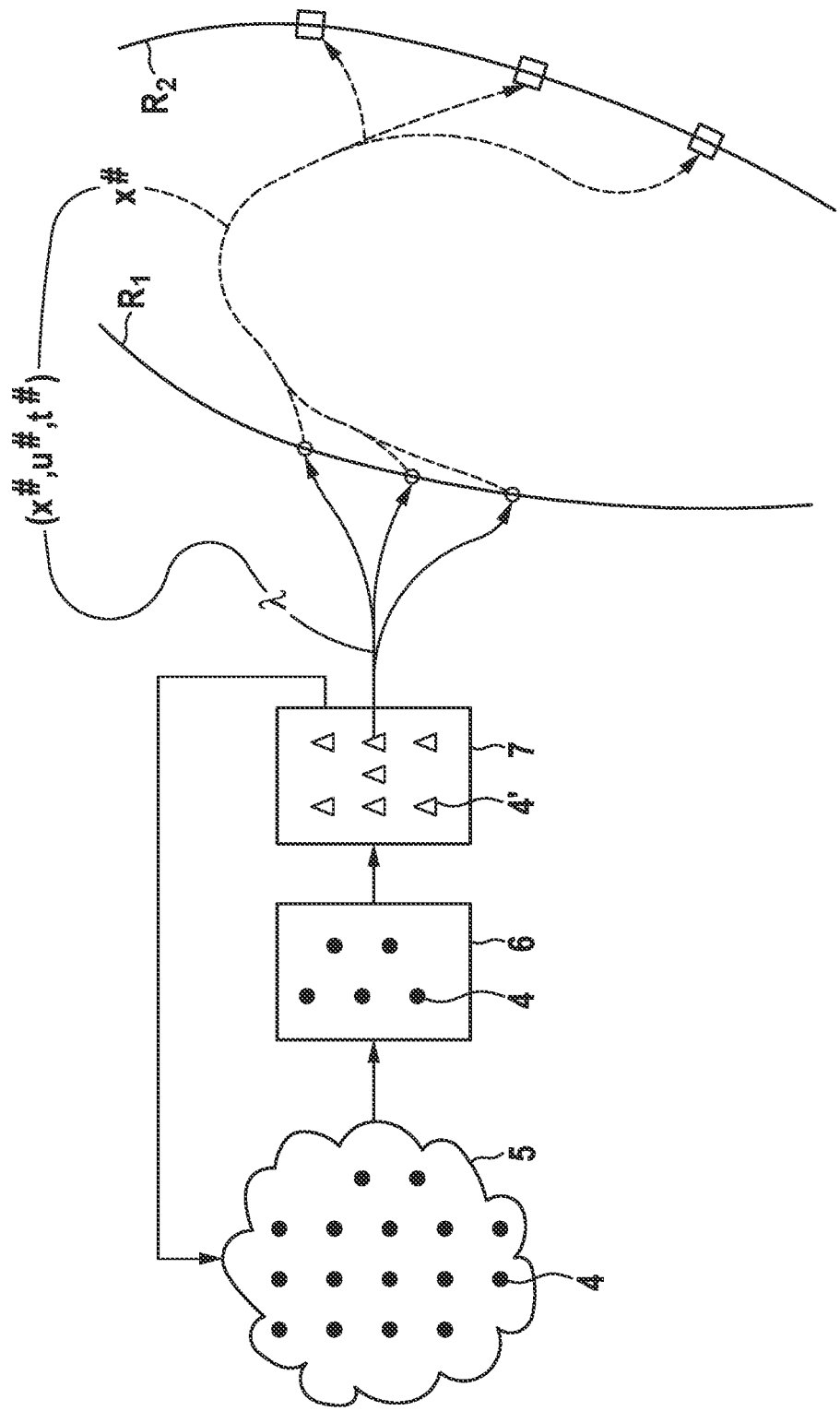
FIG. 2 shows an illustration of the combination of a genetic algorithm and shooting method for ascertaining solution $(x^\#,u^\#,t^\#)$, according to the present invention.

FIG. 2 illustrates schematically, how a genetic algorithm and the shooting method are able to interact synergistically, in order to determine a solution $(x^\#,u^\#,t^\#)$ of the optimized control problem.

A reduced set 6 of solution candidates 4 is initially formed from a set 5 of solution candidates 4 via selection by fitness. Subsequently, new solution candidates 4', which form a set 7, are produced from solution candidates 4 in set 6 by crossing, selection, and mutation. This set 7 may then be used for the next cycle of the genetic algorithm as the "next generation" of set 5 of solution candidates 4.

The most effective solution candidate 4' from set 7 is used, in order to ascertain Lagrange multipliers A. Resulting from this, are, in turn, initial values for the solution $(x^\#,u^\#,t^\#)$ sought after, which satisfy the boundary conditions on a first boundary $R_1$. By integrating the differential equations for the sought-after timing program of state $x^\#$, values on a second boundary $R_2$ are obtained, which do not yet meet the boundary conditions there. Within the scope of the shooting method, starting from the initial values ascertained by the genetic algorithm, the values on first boundary $R_1$ are optimized with the objective of satisfying the boundary conditions on second boundary $R_2$, as well. In connection with Lagrange multipliers A, the timing program of state $x^\#$ obtained in the course of this optimization determines solution $(x^\#,u^\#,t^\#)$ uniquely.

What is claimed is:

1. A method for improving a vehicle whose dynamics x are described by a scalar dynamics function $L(x,u,t)$, wherein $\dot{x}$ represents in a current state of the system vehicle, u represents a control impressed upon the vehicle, and t represents a time period, the method comprising the following steps:
   obtaining, by a processor of the vehicle, a subset of a suite of potential test cases, wherein the subset is selected by:
      setting up an optimized control problem, in which the scalar dynamics function $L(x,u,t)$, and/or an integral of the scalar dynamics function $L(x,u,t)$ with respect to time, is minimized under a boundary condition that the dynamics $\dot{x}$ of the vehicle in a first order is limited to a function $f$ according to $\dot{x}=f(x, u,t)$; and
      for each of the suite of potential test cases, ascertaining a respective closeness of the respective test case to a solution of the optimized control problem;
      based on a result of the ascertainment, sorting the suite of potential test cases in an order of their respective closeness to the solution of the optimized control problem, into a list from closest to the solution at a top of the list to furthest from the solution at a bottom of the list; and
      choosing a group of the potential test cases beginning from the top of the list as constituents of the subset;
   during operation of the vehicle:
      using, by the processor, a sensor system of the vehicle to determine states of the vehicle;
      determining, by the processor, which test cases of the subset are relevant to the determined states of the vehicle; and
      using, by the processor, the determined relevant test cases to monitor whether behavior of the vehicle is as expected; and
   initiating, by the processor, a corrective intervention in the vehicle based on a result of the monitoring being that there is a deviation of the behavior from the expected.

2. The method as recited in claim 1, wherein:
   the vehicle is tested consecutively using the test cases of the subset in the order of the list;
   for each of the tested cases of the subset used for the testing, each individual test for the respective test case that is judged to be passed is judged as passing when, starting out from the respective test case, the dynamics of the vehicle fulfill an expectation linked to the respective test case; and in response to at least one individual test not being passed, examination of the vehicle as a whole is aborted and judged not to be passed.

3. The method as recited in claim 2, wherein the testing of the vehicle includes a check as to whether a differential equation set up for the dynamics of the vehicle based on the scalar dynamics function $L(x,u,t)$ is solvable analytically.

4. The method as recited in claim 1, wherein, for each of the suite of test cases, the closeness of the respective test case is a measure of the extent to which analytic solvability of a differential equation set up for the dynamics of the vehicle based on the scalar dynamics function $L(x,u,t)$, starting from the respecting test case also implies analytic solvability, starting out from other test cases.

5. The method as recited in claim 1, wherein at least one solution of the optimized control problem is ascertained at least approximately.

6. The method as recited in claim 5, wherein the solution is rated as a test case having a highest relevance.

7. The method as recited in claim 5, wherein the solution of the optimized control problem is ascertained as a stationary solution with regard to the control u.

8. The method as recited in claim 5, wherein the solution is ascertained by a genetic algorithm, through crossing, selection, and mutation of solution candidates.

9. The method as recited in claim 8, wherein the solution is ascertained while reducing the optimized control problem to an initial value problem.

10. The method as recited in claim 9, wherein:

Lagrange multipliers $\lambda$ of the optimized control problem are ascertained by the genetic algorithm; and a timing program for a state $x^*$ of a sought after test case is ascertained while reducing the optimized control problem to the initial value problem so that the sought after test case is determined completely.

11. The method as recited in claim 1, wherein the dynamics of the vehicle are describable by a Lagrange function $L=T-V$ in a form of the scalar dynamics function $L(x,u,t)$, wherein T corresponds to a kinetic energy and V corresponds to a potential energy of the technical system.

12. A non-transitory machine-readable storage medium on which is stored a computer program that is executable by a computer of a vehicle and that, when executed by the computer, causes the computer to perform a method for improving the vehicle whose dynamics $\dot{x}$ are described by a scalar dynamics function $L(x,u,t)$, wherein x represents a current state of the vehicle, u represents a control impressed upon the vehicle, and t represents a time period, the method comprising the following steps:

obtaining a subset of a suite of potential test cases, wherein the subset is selected by:

setting up an optimized control problem, in which the scalar dynamics function $L(x,u,t)$, and/or an integral of the scalar dynamics function $L(x,u,t)$ with respect to time, is minimized under a boundary condition that the dynamics $\dot{x}$ of the vehicle in a first order is limited to a function $f$ according to $\dot{x}=f(x, u,t)$; and for each of the suite of potential test cases, ascertaining a respective closeness of the respective test case to a solution of the optimized control problem;

based on a result of the ascertainment, sorting the suite of potential test cases in an order of their respective closeness to the solution of the optimized control problem, into a list from closest to the solution at a top of the list to furthest from the solution at a bottom of the list; and choosing a group of the potential test cases beginning from the top of the list as constituents of the subset;

during operation of the vehicle:

using a sensor system of the vehicle to determine states of the vehicle;

determining which test cases of the subset are relevant to the determined states of the vehicle; and using the determined relevant test cases to monitor whether behavior of the vehicle is as expected; and initiating a corrective intervention in the vehicle based on a result of the monitoring being that there is a deviation of the behavior from the expected.

13. A vehicle whose dynamics $\dot{x}$ are described by a scalar dynamics function $L(x,u,t)$, wherein x represents a state of the vehicle, u represents a control impressed upon the vehicle, and t represents a time period, the vehicle comprising:

a sensor system; and a processor system that includes at least one processor, the processor system being configured to perform a method for improving the vehicle, the method comprising the following steps:

obtaining a subset of a suite of potential test cases, wherein the subset is selected by:

setting up an optimized control problem, in which the scalar dynamics function $L(x,u,t)$, and/or an integral of the scalar dynamics function $L(x,u,t)$ with respect to time, is minimized under a boundary condition that the dynamics $\dot{x}$ of the vehicle in a first order is limited to a function $f$ according to $\dot{x}=f(x, u,t)$; and for each of the suite of potential test cases, ascertaining a respective closeness of the respective test case to a solution of the optimized control problem; wherein based on a result of the ascertainment, sorting the suite of potential test cases in an order of their respective closeness to the solution of the optimized control problem, into a list from closest to the solution at a top of the list to furthest from the solution at a bottom of the list; and choosing a group of the potential test cases beginning from the top of the list as constituents of the subset;

during operation of the vehicle:

using the sensor system of the vehicle to determine states of the vehicle;

determining which test cases of the subset are relevant to the determined states of the vehicle; and using the determined relevant test cases to monitor whether behavior of the vehicle is as expected; and initiating a corrective intervention in the vehicle based on a result of the monitoring being that there is a deviation of the behavior from the expected.

* * * * *